H. J. CARBIS.
CHECK VALVE.
APPLICATION FILED JULY 2, 1912. RENEWED JAN. 26, 1914.
1,112,117.
Patented Sept. 29, 1914.
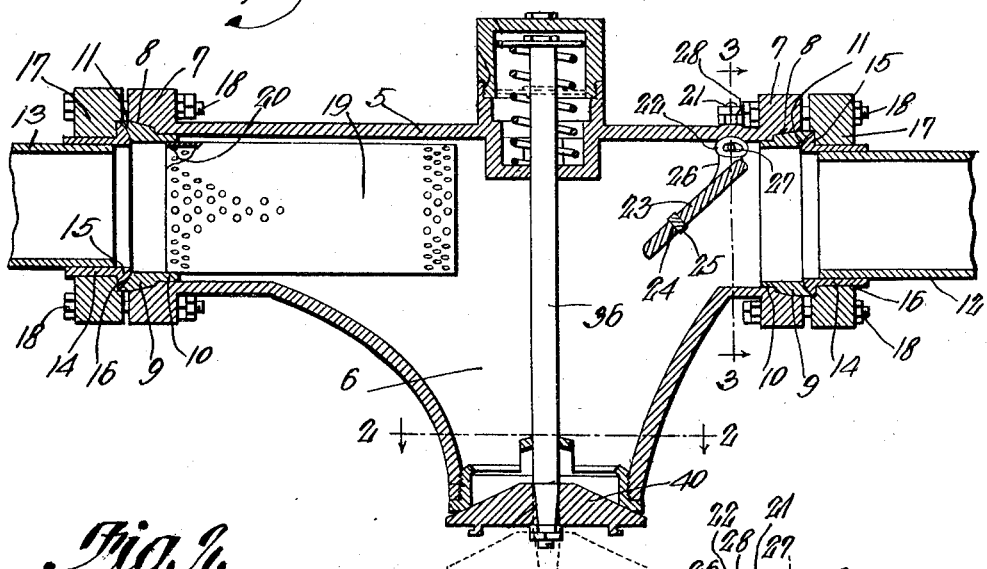
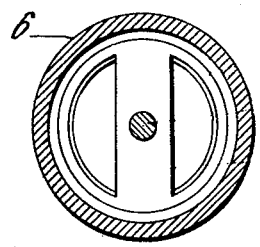
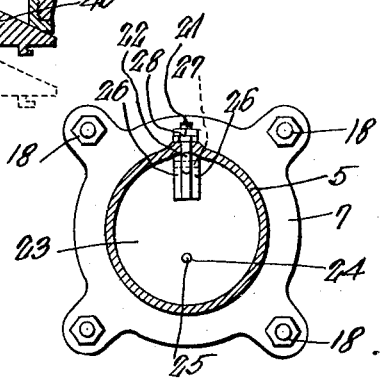
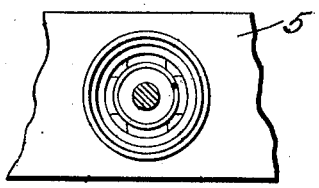
Witnesses
H. J. Carbis
Inventor
by
Attorneys

UNITED STATES PATENT OFFICE.

HARRY JOSEPH CARBIS, OF FREEPORT, PENNSYLVANIA.

CHECK-VALVE.

1,112,117.      Specification of Letters Patent.      Patented Sept. 29, 1914.

Application filed July 2, 1912, Serial No. 707,397. Renewed January 26, 1914. Serial No. 814,583.

*To all whom it may concern:*

Be it known that I, HARRY J. CARBIS, a citizen of the United States, residing at Freeport, in the county of Armstrong and State of Pennsylvania, have invented a new and useful Check-Valve, of which the following is a specification.

The present invention relates to check valves for automatic strainers, such as are employed in the feed lines for supplying water to boilers and the like.

The object of the present invention is to provide a novel and improved check valve for an automatic strainer.

With the foregoing general objects outlined, and other objects in view which will be apparent as the invention is better understood, the invention resides in the novel construction and arrangement of parts hereinafter set forth and claimed, it being understood that this device is susceptible of alterations or deviations in its details within the scope of the appended claims without departing from the spirit of the invention.

The invention has been illustrated in its preferred embodiment in the accompanying drawings, wherein similar reference characters have been employed to denote like parts, and wherein:—

Figure 1 is a longitudinal section of the strainer as interposed in a water line. Figs. 2 and 3 are sectional views taken on the lines 2—2 and 3—3 of Fig. 1, respectively. Fig. 4 is a fragmental detail in plan.

Referring specifically to the drawings, the present strainer embodies a horizontal cylindrical casing 5, the bottom of which is in the form of a hopper 6, so that the casing resembles a T-coupling. At its ends, the casing 5 is provided with external flanges 7 and internal tapered sockets 8, in which sockets, the tapered gaskets 9 fit or seat, the said gaskets having reduced extensions 10 projecting into the cylinder 5. The gaskets 9 have their outer faces concaved as designated by the numeral 11.

The numerals 12 and 13 designate the sections of the water line, the former communicating with the supply of water and the latter communicating with the boiler or the like into which the water is discharged. On the ends of the pipes or tubes 12 and 13 are brazed or otherwise secured metallic gaskets 14 having the external flanges 15 at their outer ends, the outer faces of the flanges 15 being convexed and fitting in the concaved faces of the metallic gaskets 9, so as to form a ball and socket joint. A plate or ring 17 is mounted on each gasket 14 and complements the corresponding flange 7 of the casing, and bolts 18 connect the corresponding flanges 7 and the plates 17 so as to compress the gaskets tightly against each other for providing a tight joint between the pipes 12 and 13 and the casing 5. It will be noted at this point that the gaskets in having a ball and socket connection permit the pipes 12 and 13 to lie slightly out of axial relation with the casing 5 as may be necessary or desirable.

A straining cylinder 19, which may be a sieve or metallic cup provided with numerous perforations is arranged concentrically within one end of the casing 5, the open end being secured to the extension 10 of the corresponding gasket 9 by means of rivets 20 or in any other suitable manner.

A bolt 21 passes through the top of the cylinder 5 adjacent its other end and has a longitudinally elongated loop 22 at its inner end bearing against the top of the casing, and a flap valve 23 is connected to the bolt 21. This valve 23 is provided with a restricted vent 24, which may be normally closed by a plug 25. A pair of ears 26 project from the inner face of the valve 23 adjacent its upper edge and pass over the sides of the loop 22, a pin 27 passing through the ears 26 and through the loop 22. This pin 27 is slidably arranged in the loop 22 and therefore permits the valve 23 to swing vertically and slide or shift longitudinally. The bolt 21 bears nuts 28 on its upper end for retaining same in position. The valve 23 may therefore swing outwardly to seat against the extension 10 of the corresponding gasket 9 and as the valve may slide longitudinally in the loop 22 from which it is suspended, the same may seat at all times against the extension 10, thus also providing for wear on the corresponding parts or compensating for any abnormal length of the extension 10. The valve 23 in opening inwardly permits the water to pass from the pipe 12 into the casing 5 as will hereinafter more fully appear.

The lower end of the hopper 6 is normally closed by a spring pressed valve 40 seating thereagainst.

The present strainer is applicable particularly for the feed lines of locomotives, in which capacity, the end of the casing 5 having the valve 23 is connected to the tank of the tender and the other end of the casing is connected to the injector or inspirator of the locomotive. Then as the injector or inspirator is brought into operation, the water will be drawn through the pipe line to be discharged into the boiler, the flap valve 23 swinging open to permit of the passage of water through the casing 5. The straining cylinder 19 will arrest or retard the passage of sediment or other extraneous matter causing the sediment and foreign matter to reciprocate into the hopper 6 where it is accumulated. The sediment which collects in the hopper 6 and around the straining cylinder 19 may be ejected by forcing steam into the casing 5 from the pipe 13 connecting the casing with the ejector or boiler, in which event, the steam pressure will close the flap valve 23 and will force the valve 40 downwardly against the tension of its spring. The valve 40 in being forced open will cause the precipitated matter or sediment to be discharged from the hopper from the casing 5, thereby clearing the casing. Whenever the steam pressure is relieved, the valve 40 will be seated, and water may again be drawn through the water line as before.

During cold weather, or in cold climates, the plug 25 is removed from the valve 23 so that when steam is forced backwardly into the casing 5 a restricted flow of steam or hot water will be permitted to enter the pipe 12 leading to the tender or water tank so as to warm the water slightly in order to prevent freezing of the water or hose connections, but ordinarily, the plug 25 is inserted in the vent 24 in order to prevent the ingress of steam or hot water into the pipe 12 or the tank to which it is connected. This device may also be found useful for discharging hot water from the pipe leading from the casing to the water tank by repeatedly permitting steam to enter the casing 5 and then permitting the water to flow through the casing, the hot water thereby flowing from the pipe 12 through the casing to the pipe 13 and then being forced backwardly through the casing 5 and out of the hopper 6.

This device may be employed in various feed lines for supplying water to boilers or other apparatus, and may be employed in various capacities, such as are apparent to those skilled in the art. The various parts are readily assembled and may be taken apart for cleaning, repair or replacement. It will also be evident that the present invention carries out the objects aimed at in a satisfactory manner, and provides a desirable device of the character indicated for the purposes for which it is designed.

Having thus described the invention, what is claimed as new is:—

In a device of the class described, a horizontal cylindrical casing, a gasket fitting in one end thereof, a bolt passing through the top of the casing adjacent the gasket and having an inner longitudinally elongated loop bearing against the top of the casing, a flap valve seatable against the gasket and having ears fitting over the said loop, and a pin carried by the ears and working through the loop to permit the valve to swing and shift longitudinally.

In testimony that I claim the foregoing as my own, I have hereto affixed my signature in the presence of two witnesses.

HARRY JOSEPH CARBIS.

Witnesses:
JESSE C. McKEE,
B. B. McKEE.